United States Patent
Issa et al.

(10) Patent No.: US 7,930,201 B1
(45) Date of Patent: Apr. 19, 2011

(54) EDP PORTAL CROSS-PROCESS INTEGRATED VIEW

(75) Inventors: Philip Issa, Irving, TX (US); Mark Adams, Overland Park, KS (US); Larry E. Baker, Arlington, TX (US); Bill G. Branch, Jr., Shawnee, KS (US); Dale Roof, Lewisville, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1320 days.

(21) Appl. No.: 10/643,417

(22) Filed: Aug. 19, 2003

Related U.S. Application Data

(60) Provisional application No. 60/404,824, filed on Aug. 19, 2002.

(51) Int. Cl.
*G06F 9/46* (2006.01)
(52) U.S. Cl. .................................. 705/8; 705/9
(58) Field of Classification Search .................. 705/8, 9
See application file for complete search history.

(56) References Cited

U.S. PATENT DOCUMENTS

| | | | | |
|---|---|---|---|---|
| 5,208,765 A | * | 5/1993 | Turnbull | 702/84 |
| 5,548,506 A | * | 8/1996 | Srinivasan | 705/8 |
| 5,557,515 A | | 9/1996 | Abbruzzese et al. | |
| 5,692,125 A | * | 11/1997 | Schloss et al. | 705/9 |
| 5,729,746 A | | 3/1998 | Leonard | |
| 5,758,328 A | | 5/1998 | Giovannoli | |
| 5,765,140 A | * | 6/1998 | Knudson et al. | 705/9 |
| 5,784,539 A | | 7/1998 | Lenz | |
| 5,815,152 A | | 9/1998 | Collier et al. | |
| 5,848,393 A | | 12/1998 | Goodridge et al. | |
| 5,864,480 A | * | 1/1999 | Ladd | 700/83 |
| 5,893,074 A | * | 4/1999 | Hughes et al. | 705/8 |
| 5,930,798 A | | 7/1999 | Lawler et al. | |
| 5,949,999 A | | 9/1999 | Song et al. | |
| 5,960,200 A | | 9/1999 | Eager et al. | |
| 5,974,392 A | | 10/1999 | Endo | |
| 5,999,908 A | | 12/1999 | Abelow | |
| 6,011,917 A | | 1/2000 | Leymann et al. | |
| 6,289,502 B1 | | 9/2001 | Garland et al. | |
| 6,324,647 B1 | | 11/2001 | Bowman-Amuah | |
| 6,405,364 B1 | | 6/2002 | Bowman-Amuah | |
| 6,424,948 B1 | | 7/2002 | Dong et al. | |
| 6,505,176 B2 | | 1/2003 | DeFrancesco, Jr. et al. | |
| 6,519,571 B1 | | 2/2003 | Guheen et al. | |
| 6,574,605 B1 | | 6/2003 | Sanders et al. | |

(Continued)

OTHER PUBLICATIONS

Hemmat, et al., Provisional Patent Application entitled, "Enterprise Architecture Development Process," filed Aug. 19, 2002, U.S. Appl. No. 60/404,824.

(Continued)

*Primary Examiner* — Johnna R Loftis

(57) ABSTRACT

A method for project development within an enterprise. The method can consist of gathering project related information from different sources and using the information to create reports. The reports can include information from more than one source. The information and the reports can be displayed for assessment in a graphical user interface providing access to a set of sub-graphical user interfaces. The displayed information and reports can be analyzed to monitor the progress of the project through the project development process. An end of a phase of the project development process can be determined and, upon the completion of a previous phase, an individual with responsibility for a next phase can be notified by automatically sending a message to the individual, informing the individual that the next phase can begin.

19 Claims, 6 Drawing Sheets

U.S. PATENT DOCUMENTS

| | | | |
|---|---|---|---|
| 6,601,234 B1 | 7/2003 | Bowman-Amuah | |
| 6,636,585 B2 | 10/2003 | Salzberg et al. | |
| 6,658,643 B1 | 12/2003 | Bera | |
| 6,662,357 B1 | 12/2003 | Bowman-Amuah | |
| 6,671,818 B1 | 12/2003 | Mikurak | |
| 6,684,191 B1 * | 1/2004 | Barnard et al. | 705/7 |
| 6,694,329 B2 | 2/2004 | Murray | |
| 6,721,713 B1 | 4/2004 | Guheen et al. | |
| 6,732,028 B2 | 5/2004 | Vanstory et al. | |
| 6,799,145 B2 | 9/2004 | Kennedy et al. | |
| 6,832,202 B1 | 12/2004 | Schuyler et al. | |
| 6,865,565 B2 | 3/2005 | Rainsberger et al. | |
| 6,904,593 B1 | 6/2005 | Fong et al. | |
| 6,961,687 B1 | 11/2005 | Myers, Jr. et al. | |
| 6,964,044 B1 | 11/2005 | Hudson et al. | |
| 6,973,640 B2 | 12/2005 | Little et al. | |
| 6,990,437 B1 | 1/2006 | Abu El Ata | |
| 7,047,518 B2 | 5/2006 | Little et al. | |
| 7,051,036 B2 * | 5/2006 | Rosnow et al. | 707/102 |
| 7,092,968 B1 | 8/2006 | Ebel et al. | |
| 7,101,031 B2 | 9/2006 | Medin | |
| 7,139,999 B2 | 11/2006 | Bowman-Amuah | |
| 7,162,427 B1 | 1/2007 | Myrick et al. | |
| 7,212,987 B2 * | 5/2007 | Swanke et al. | 705/9 |
| 7,240,325 B2 | 7/2007 | Keller | |
| 7,292,990 B2 | 11/2007 | Hughes | |
| 7,321,864 B1 | 1/2008 | Gendler | |
| 7,330,822 B1 | 2/2008 | Robson et al. | |
| 7,350,185 B2 | 3/2008 | Sparago et al. | |
| 7,360,201 B2 | 4/2008 | Srivastava | |
| 7,389,217 B2 | 6/2008 | Benny et al. | |
| 7,395,540 B2 | 7/2008 | Rogers | |
| 7,403,948 B2 | 7/2008 | Ghoneimy et al. | |
| 7,430,498 B2 | 9/2008 | Butterfield et al. | |
| 7,475,107 B2 | 1/2009 | Maconi et al. | |
| 7,487,079 B2 | 2/2009 | Benny et al. | |
| 7,490,319 B2 | 2/2009 | Blackwell et al. | |
| 7,559,049 B1 | 7/2009 | Hemmat et al. | |
| 7,631,297 B2 | 12/2009 | Childress et al. | |
| 7,640,531 B1 | 12/2009 | Akram et al. | |
| 7,653,592 B1 | 1/2010 | Flaxman et al. | |
| 7,664,664 B2 | 2/2010 | King et al. | |
| 7,685,013 B2 | 3/2010 | Gendler | |
| 7,685,604 B2 | 3/2010 | Baartman et al. | |
| 7,716,073 B1 | 5/2010 | Martin | |
| 7,849,438 B1 | 12/2010 | Hemmat et al. | |
| 2002/0026630 A1 | 2/2002 | Schmidt et al. | |
| 2002/0032596 A1 | 3/2002 | Ohsaki et al. | |
| 2002/0042731 A1 | 4/2002 | King, Jr. et al. | |
| 2002/0046394 A1 | 4/2002 | Do et al. | |
| 2002/0049816 A1 | 4/2002 | Costin, IV et al. | |
| 2002/0059512 A1 | 5/2002 | Desjardins | |
| 2002/0087381 A1 | 7/2002 | Freeman et al. | |
| 2002/0147801 A1 | 10/2002 | Gullotta et al. | |
| 2003/0018952 A1 | 1/2003 | Roetzheim | |
| 2003/0023675 A1 | 1/2003 | Ouchi et al. | |
| 2003/0033191 A1 | 2/2003 | Davies et al. | |
| 2003/0055811 A1 | 3/2003 | Stork et al. | |
| 2003/0061266 A1 | 3/2003 | Ouchi | |
| 2003/0110067 A1 | 6/2003 | Miller et al. | |
| 2003/0145124 A1 | 7/2003 | Guyan et al. | |
| 2003/0171970 A1 | 9/2003 | Kinsella | |
| 2003/0181991 A1 | 9/2003 | Chau et al. | |
| 2004/0002883 A1 | 1/2004 | Andrews et al. | |
| 2004/0030421 A1 | 2/2004 | Haley | |
| 2004/0039629 A1 | 2/2004 | Hoffman et al. | |
| 2004/0098154 A1 | 5/2004 | McCarthy | |
| 2004/0111430 A1 | 6/2004 | Hertling et al. | |
| 2004/0143477 A1 | 7/2004 | Wolff | |
| 2004/0143811 A1 | 7/2004 | Kaelicke et al. | |
| 2004/0148183 A1 | 7/2004 | Sadiq | |
| 2004/0162741 A1 | 8/2004 | Flaxer et al. | |
| 2004/0172445 A1 | 9/2004 | Singh et al. | |
| 2004/0215544 A1 | 10/2004 | Formale et al. | |
| 2005/0004825 A1 | 1/2005 | Ehrler et al. | |
| 2005/0027585 A1 | 2/2005 | Wodtke et al. | |
| 2005/0027733 A1 | 2/2005 | Donahue | |
| 2005/0114829 A1 | 5/2005 | Robin et al. | |
| 2005/0137920 A1 | 6/2005 | O'Connor et al. | |
| 2006/0031078 A1 | 2/2006 | Pizzinger et al. | |
| 2006/0047555 A1 | 3/2006 | Kang et al. | |
| 2006/0059423 A1 | 3/2006 | Lehmann et al. | |
| 2006/0106627 A1 | 5/2006 | Al-Nujaidi | |
| 2006/0173908 A1 | 8/2006 | Browning et al. | |
| 2006/0235732 A1 | 10/2006 | Miller et al. | |
| 2007/0179790 A1 | 8/2007 | Leitch et al. | |
| 2007/0276674 A1 | 11/2007 | Hemmat | |
| 2008/0319816 A1 | 12/2008 | Benny et al. | |
| 2009/0320088 A1 | 12/2009 | Gill et al. | |

OTHER PUBLICATIONS

Hemmat, Merzad, Patent Application entitled, "Method for Discovering Functional and System Requirements in an Integrated Development Process," filed Aug. 18, 2003, U.S. Appl. No. 10/643,334.

Brandes, Tracy, et al., Patent Application entitled, "Change Request Processing in an Enterprise Development Process," filed Aug. 19, 2003, U.S. Appl. No. 10/643,418.

Issa, Philip, et al., Patent Application entitled, "Integrated Software Implementation of Enterprise Development Process," filed Aug. 19, 2003, U.S. Appl. No. 10/643,419.

Hemmat, Merzad, et al., Patent Application entitled, "Integrated Advance Scheduling of Indeterminate Projects in an Integrated Development Process," filed Dec. 8, 2003, U.S. Appl. No. 10/730,601.

Advisory Action dated Nov. 17, 2009, 17 pages, U.S. Appl. No. 11/248,342, filed Oct. 12, 2005.

Final Office Action dated Oct. 26, 2009, 30 pages, U.S. Appl. No. 11/213,239, filed Aug. 12, 2005.

Office Action dated Oct. 27, 2009, 15 pages, U.S. Appl. No. 10/643,418.

Office Action dated Oct. 29, 2009, 14 pages, U.S. Appl. No. 11/181,154.

"Enterprise Resource Planning (EPR) Project," University of Florida, Jan. 2003, pp. 1-25, www.bridges.ufl.edu/implementation/teams/processes/EPR-Project-Work-Policies-draft-v6.pdf.

Notice of Panel Decision dated Oct. 13, 2009 14 pages, U.S. Appl. No. 10/429,615, filed May 5, 2003.

Hindman, Leslie Shannon, et al., Patent Application entitled, "Tool and Method for Work Authorization in an Outsourced EDP Process," filed May 2, 2005, U.S. Appl. No. 11/120,224.

Arredondo, Barbara, et al., ,Patent Application entitled, "Small Enhancement Process Workflow Manager," filed Jul. 14, 2005, U.S. Appl. No. 11/181,154.

Higgins, Gregory, et al., Patent Application entitled, "Multiple Conditional Pipeline Process Architecture," filed Sep. 14, 2005, U.S. Appl. No. 11/226,121.

)Hemmat, Merzad, et al., Patent Application entitled, "Streamlined discover-Design Initiative," filed Jan. 19, 2005, U.S. Appl. No. 11/038,598.

Arredondo, Barbara, et al., Patent Application entitled, "System and Method for Managing Enterprise Services Projects," filed Oct. 12, 2005, U.S. Appl. No. 11/248,342.

Bray Curtis A., et al., Patent Application entitled, "Technology Assessment and Selection in Enterprise Development Process," filed Aug. 26, 2005, U.S. Appl. No. 11/213,239.

Office Action dated Dec. 1, 2005, 16 pages, U.S. Appl. No. 10/429,615, filed May 5, 2003.

Final Office Action dated Apr. 18, 2006, 16 pages, U.S. Appl. No. 10/429,615, filed May 5, 2003.

Office Action dated Jan. 4, 2007, 14 pages, U.S. Appl. No. 10/429,615, filed May 5, 2003.

Final Office Action dated Sep. 10, 2007, 22 pages, U.S. Appl. No. 10/429,615, filed May 5, 2003.

Office Action dated Dec. 27, 2007, 14 pages, U.S. Appl. No. 10/643,334, filed Aug. 18, 2003.

Office Action (Restriction) dated Sep. 15, 2008, 7 pages, U.S. Appl. No. 10/643,334, filed Aug. 18, 2003.

Final Office Action dated Mar. 23, 2009, 19 pages, U.S. Appl. No. 10/643,334, filed Aug. 18, 2003.

Office Action (Restriction) dated Jul. 20, 2009, 6 pages, U.S. Appl. No. 10/643,334, filed Aug. 18, 2003.

Office Action dated Mar. 30, 2007, 16 pages, U.S. Appl. No. 10/730,601, filed Dec. 8, 2003.
Final Office Action dated Sep. 20, 2007, 15 pages, U.S. Appl. No. 10/730,601, filed Dec. 8, 2003.
Advisory Action dated Dec. 27, 2007, 3 pages, U.S. Appl. No. 10/730,601, filed Dec. 8, 2003.
Office Action dated Apr. 29, 2008, 18 pages, U.S. Appl. No. 10/730,601, filed Dec. 8, 2003.
Final Office Action dated Oct. 28, 2008, 16 pages, U.S. Appl. No. 10/730,601, filed Dec. 8, 2003.
Notice of Allowance dated Mar. 13, 2009, 12 pages, U.S. Appl. No. 10/730,601, filed Dec. 8, 2003.
Office Action dated Sep. 23, 2008, 13 pages, U.S. Appl. No. 10/643,418.
Final Office Action dated Apr. 1, 2009, 14 pages, U.S. Appl. No. 10/643,418.
Advisory Action dated Jul. 7, 2009, 3 pages, U.S. Appl. No. 10/643,418.
Office Action dated Feb. 21, 2007, 22 pages, U.S. Appl. No. 10/643,419, filed Aug. 19, 2003.
Final Office Action dated Aug. 1, 2007, 25 pages, U.S. Appl. No. 10/643,419, filed Aug. 19, 2003.
Advisory Action dated Nov. 13, 2007, 7 pages, U.S. Appl. No. 10/643,419, filed Aug. 19, 2003.
Notice of Abandonment dated Mar. 17, 2008, 2 pages, U.S. Appl. No. 10/643,419, filed Aug. 19, 2003.
Office Action dated Apr. 10, 2009, 22 pages, U.S. Appl. No. 10/857,287, filed May 27, 2004.
Final Office Action dated Sep. 15, 2009, 8 pages, U.S. Appl. No. 10/857,287, filed May 27, 2004.
Office Action dated Aug. 17, 2009, 26 pages, U.S. Appl. No. 11/120,224, filed May 2, 2005.
Office Action dated Aug. 4, 2009, 22 pages, U.S. Appl. No. 11/226,121, filed Sep. 14, 2005.
Office Action dated Aug. 3, 2009, 28 pages, U.S. Appl. No. 11/038,598, filed Jan. 19, 2005.
Office Action dated Aug. 18, 2008, 25 pages, U.S. Appl. No. 11/248,342, filed Oct. 12, 2005.
Office Action dated Feb. 19, 2009, 22 pages, U.S. Appl. No. 11/248,342, filed Oct. 12, 2005.
Final Office Action dated Sep. 3, 2009, 19 pages, U.S. Appl. No. 11/248,342, filed Oct. 12, 2005.
Office Action dated Apr. 30, 2009, 21 pages, U.S. Appl. No. 11/213,239, filed Aug. 12, 2005.
Advisory Action dated Dec. 8, 2009, 2 pages, U.S. Appl. No. 10/857,287, filed May 27, 2004.
Advisory Action dated May 4, 2010, 3 pages, U.S. Appl. No. 11/120,224, filed May 2, 2005.
Final Office Action dated Apr. 13, 2010, 49 pages, U.S. Appl. No. 10/643,418.
Office Action dated Feb. 3, 2010, 43 pages, U.S. Appl. No. 10/857,287, filed May 27, 2004.

Final Office Action dated May 25, 2010, 55 pages, U.S. Appl. No. 11/181,154.
Examiner's Answer dated Jun. 8, 2010, 21 pages, U.S. Appl. No. 11/248,342, filed Oct. 12, 2005.
Upside Software, Inc., Using Upside Contract's workflow Engine to Improve Business Processes (Nov. 2004), pp. 1-2. Accessed from www.upsidesoft.com/upside+software/.../BP%20Workflow%20FINAL%20110404.pdf.
Final Office Action dated Jun. 16, 2010, 58 pages, U.S. Appl. No. 11/038,598, filed Jan. 19, 2005.
Final Office Action dated Feb. 24, 2010, 27 pages, U.S. Appl. No. 11/210,224, filed May 2, 2005.
Department of Defense, Systems Management College, Systems Engineering Fundamentals, Jan. 2001, Defencse Acquisition University Press, pp. 1-222.
Final Office Action dated Dec. 22, 2009, 31 pages, U.S. Appl. No. 10/643,334, filed Aug. 18, 2003.
Advisory Action dated Mar. 12, 2010, 8 pages, U.S. Appl. No. 10/643,334, filed Aug. 18, 2003.
Final Office Action dated Mar. 30, 2010, 48 pages, U.S. Appl. No. 11/226,121, filed Sep. 14, 2005.
Pyron, Tim, "Sams Teach Yourself Microsoft® Project 2000 in 24 Hours," Safari Books Online, May 4, 2000, http://proquest.safaribooksonline.com/0-672-31814-8, 6 pages.
Office Action dated Jul. 1, 2010, 37 pages, U.S. Appl. No. 11/120,224, filed May 2, 2005.
Babar, Muhammad Ali, et al., "An Industrial Case of Exploiting Product Line Architectures in Agile Software Development," ACM SPLC, 2009, pp. 171-179.
Dossani, Rafiq, et al., "The Internet's Role in Offshored Services: A Case Study of India," ACM Transactions on Internet Technology, vol. 7, No. 3, Article 15, Publication date Aug. 2007, 21 pages.
Unphon, Hataichanok, "Making Use of Architecture Throughout the Software Life Cycle—How the Build Hierarchy can Facilitate Product Line Development," IEEE SHARK, May 2009, pp. 41-48.
Yalaho, Anicet, et al., "A Conceptual Process Framework for IT-Supported International Outsourcing of Software Production," Department of Computer Science and Information Systems, 2005, pp. 1-10.
Advisory Action dated Jul. 21, 2010, 11 pages, U.S. Appl. No. 10/643,418.
Notice of Allowance dated Jul. 16, 2010, 26 pages, U.S. Appl. No. 10/857,287, filed May 27, 2004.
Advisory Action dated Aug. 31, 2010, 3 pages, U.S. Appl. No. 11/038,598, filed Jan. 19, 2005.
Hammat, Marzad, et al., Patent Application entitled, "Enterprise Software Development Process for Outsourced Developers," filed May 27, 2004, U.S. Appl. No. 10/857,287.
Final Office Action dated Nov. 22, 2010, U.S. Appl. No. 11/120,224, filed on May 2, 2005.
Office Action dated Feb. 1, 2011, U.S. Appl. No. 11/038,598, filed on Jan. 19, 2005.

* cited by examiner

BLUEPRINT REQUESTED: YES
BLUEPRINT TYPE: BOTH NETWORK AND CONCEPTUAL
BLUEPRINT DOM. NAME: C5698 BDOC_OCTSYSTEM AND PROCESS REQUEST FOR CAPABILITIES ATM

| | 150% | 612 SUPPLIER DESCRIPTION | IMPACT TYPE | SUMMARY |
|---|---|---|---|---|
| LOE HOURS: | VIEW 10670 | 1100 NETWORK OPERATIONS | TEST | ASA/TSA/BSO/NTAC REQUIREMENTS AND TESTING |
| HW/SW COST: | $0 | | | |
| LOE HOURS: | VIEW 400 | 1200 FIELD OPERATIONS | SUPPORT | REQUIREMENTS AND TESTING |
| HW/SW COST: | $0 | | | |
| LOE HOURS: | VIEW 400 | 1300 SERVICE DELIVERY | TEST | REQUIREMENTS AND TESTING |
| HW/SW COST: | $0 | | | |
| LOE HOURS: | VIEW 500 | 1400 MANAGED NETWORK OPERATIONS | PROCESS | REQUIREMENTS AND TESTING |
| HW/SW COST: | $0 | | | |
| LOE HOURS: | VIEW 250 | 1500 ACCESS MANAGEMENT | TEST | REQUIREMENTS AND TESTING FOR FMS |
| HW/SW COST: | $0 | | | |
| LOE HOURS: | VIEW 0 | 1730 ES - PROJECT MANAGEMENT | SUPPORT | KEEP IN-LOOP TO ENSURE APPROPRIATE ES INVOLVEMENT |
| HW/SW COST: | $0 | | | |
| LOE HOURS: | VIEW 1200 | 2300 CAPACITY PLANNING | SUPPORT | SWITCH, ATM AND DCS SUPPORT |
| HW/SW COST: | $0 | | | |
| LOE HOURS: | VIEW 50 | 2310 INTEGRATION TESTING | SUPPORT | KIL FOR ANY LAB AND LABNET IMPACTS |
| HW/SW COST: | $0 | | | |
| LOE HOURS: | VIEW 610 250 | 2400 SYSTEM DESIGN | SUPPORT | ANALYSIS, DESIGN AND NETWORK DESIGN DOCUMENTATION |
| HW/SW COST: | $0 | | | |
| LOE HOURS: | VIEW 120 | 2401 COMPUTING SYSTEMS DESIGN | SUPPORT | COMPUTING SYSTEMS PLTFM ANALYSIS, DESIGN, DOC & H/W |
| HW/SW COST: | $750000 | | | |
| LOE HOURS: | VIEW 180 | 2402 OSSNET DESIGN | SUPPORT | OSSNET & LABNET CONNECTIVITY ANALYSIS, DESIGN, DOCS & H/W |
| HW/SW COST: | $102000 | | | |

FIG. 6

EDP PORTAL CROSS-PROCESS INTEGRATED VIEW

CROSS-REFERENCE TO RELATED APPLICATIONS

This application is related to and claims priority from U.S. Provisional Application Ser. No. 60/404,824, filed Aug. 19, 2002 and entitled "Enterprise Architecture Development Process" and addresses subject matter related to U.S. patent application Ser. No. 10/429,615, filed May 5, 2003 and entitled "Defining and Sizing Feasible Approaches to Business Needs within an Integrated Development Process" both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the integration of workflow management processes throughout an enterprise. More specifically, a software tool is provided through which data related to a software development project can be gathered, displayed, managed, and disseminated.

BACKGROUND OF THE INVENTION

Technologies that address the problem of integrating existing computer and communication systems with new systems in an organized, efficient, and economically scaleable manner can be referred to collectively as Enterprise Application Integration (EAI). The software engineering discipline that addresses EAI and the underlying integration issue is the domain of enterprise architecture. Architectural engineers typically realize architectures by specifying the components to be used (hardware, software, network, etc.); depicting how the components fit together (where and when in the process); clearly defining the interfaces and boundaries between components; setting guidelines and standards; and determining the layers, services, dependencies, and abstraction levels.

SUMMARY OF THE INVENTION

An embodiment of the invention is a method for project development within an enterprise. The method can consist of gathering project related information from different sources within the enterprise and using the gathered information to create a plurality of reports. At least one of the reports can include a portion of the project related information from a first source and a portion of the project related information from a second source. The gathered information and the reports can be displayed for assessment in a graphical user interface providing access to a plurality of sub-graphical user interfaces. The displayed information and reports can be analyzed to monitor the progress of the project through the project development process. An end of a phase of the project development process can be determined and, upon the completion of a previous phase within the project development process, at least one individual with responsibility for a next phase of the project development process can be notified by automatically sending a message to the at least one of the individuals with responsibility for the next phase in the project development process, the message informing the at least one individual that the next phase can begin. The sources from which project related information is gathered can be one or more of a group of sources including a human resources data system, a billing system, a fiscal information system, a financial time reporting system, a knowledge/document management system, a project management information system, a requirements management system, a process modeling tool, and a tactical project planning and management tool. The reports can be one or more of a group of reports including the actual costs of a project, the actual time spent on a project, and quality metrics related to the actual costs and time of a project compared to the estimated costs and time. Further steps in the monitoring of the progress of the project can be performed through interaction with a graphical user interface and can be one or more of a group of steps including approving the concept to move from one phase of the project development process to the next phase, providing an estimate of the cost of a change to the scope of a project, viewing the status of a project, viewing a timeline of the work done on a project, viewing a timeline of the work remaining on a project, viewing the human resources assigned to a project, viewing the large-scale initiatives to which the project is related, automatically updating a schedule when project-related events occur, and calculating a score reflecting the worthiness of a project-related concept.

An alternative embodiment is a method for managing a project development process. The method can consist of characterizing the type of work to be done within a project, categorizing the type of work based on the characterization, routing the work to an appropriate organization based on the categorization, displaying steps in the project development process in a set of computer-based graphical user interfaces all of which can be accessed, via one or more electronic links, from a single graphical user interface, and performing actions in the project development process through interactions with the graphical user interfaces. The actions can be one or more of a group of actions including approving the concept to move from one phase of the project development process to the next phase, providing an estimate of the cost of a change to the scope of a project, viewing the status of a project, viewing a timeline of the work done on a project, viewing a timeline of the work remaining on a project, viewing the human resources assigned to a project, viewing the large-scale initiatives to which the project is related, calculating a score reflecting the worthiness of a project-related concept, creating reports related to the project development process, and viewing the reports. Upon the completion of a phase within the project development process, a message can be automatically sent to at least one individual with responsibility for the next phase in the project development process informing the individual that the next phase can begin. When project-related events occur, a schedule can be automatically updated.

Another alternative embodiment is a system for managing a project development process. The system can consist of a set of computer-based graphical user interfaces all of which can be accessed, via one or more electronic links, from a single graphical user interface. Each of the graphical user interfaces can display project-related information and can allow actions in the management of the progress of a project to be performed through interaction with the graphical user interfaces. The actions can be one or more of a group of actions including approving the concept to move from one phase of the project development process to the next phase, providing an estimate of the cost of a change to the scope of a project, viewing the status of a project, viewing a timeline of the work done on a project, viewing a timeline of the work remaining on a project, viewing the human resources assigned to a project, viewing the large-scale initiatives to which the project is related, calculating a score reflecting the worthiness of a project-related concept, creating reports related to the project development process, and viewing the reports. Upon the completion of a phase within the project development process, a message can be automatically sent to at least one individual with responsibility for the next phase in the project development process informing the individual that the next phase can begin. When project-related events occur, a schedule can be automatically updated.

BRIEF DESCRIPTION OF THE DRAWINGS

FIG. 6 is a depiction of another graphical user interface that might appear in the Portal.

DETAILED DESCRIPTION OF THE PREFERRED EMBODIMENTS

Figure 1:
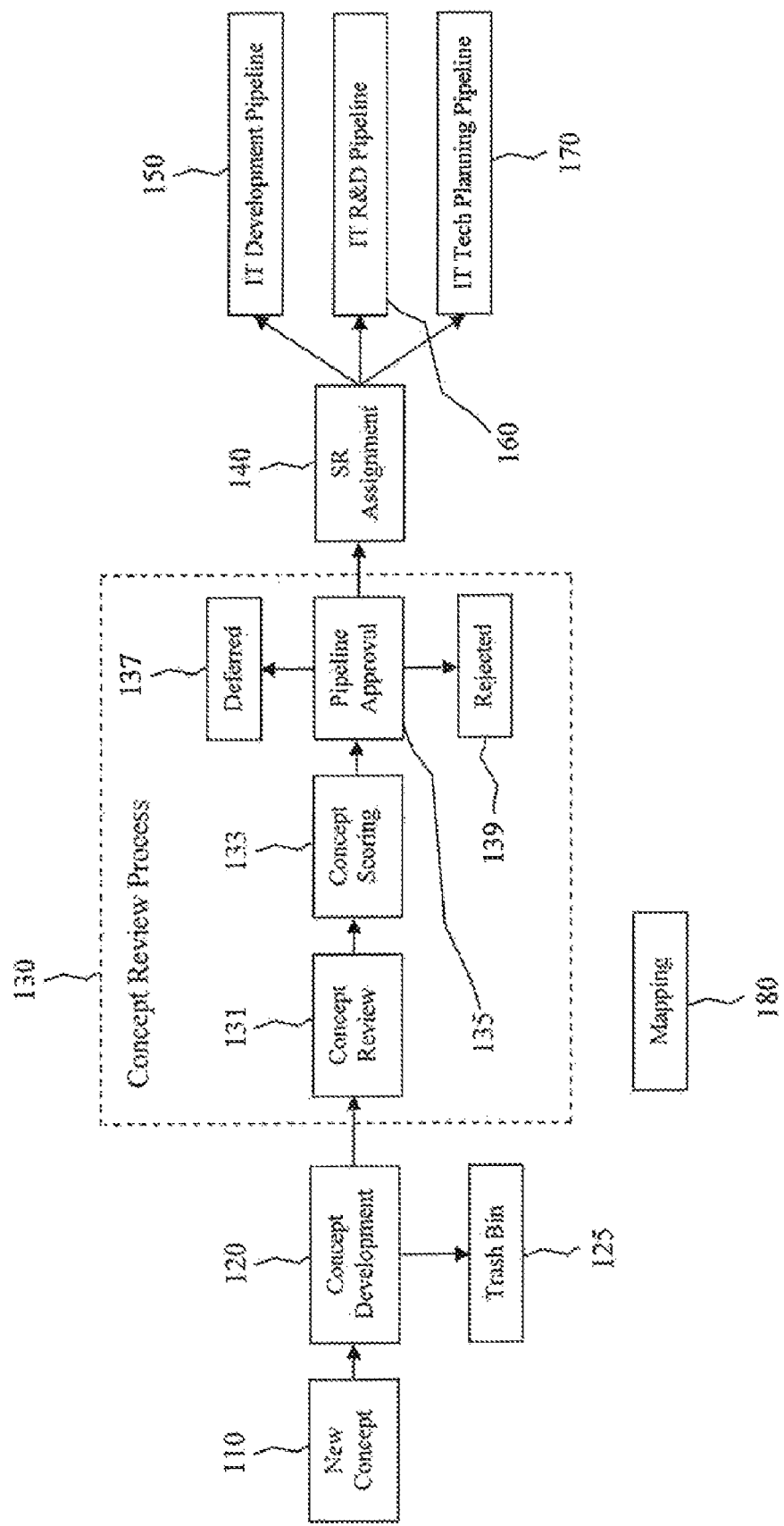
FIG. 1 is a flow chart depicting an embodiment of the concept creation and selection process.

An enterprise-wide EAI process can be employed to facilitate the integration of enterprise architecture. A suitable process, known as the Enterprise Development Process (EDP), is described in detail in U.S. Provisional Application Ser. No. 60/404,824, filed Aug. 19, 2002 and entitled "Enterprise Architecture Development Process", which is incorporated herein by reference. EDP provides rigor to the process of enterprise-wide software development. Consistent checkpoints throughout the process allow significant events to occur in a predictable, scheduled manner. The EDP process typically comprises five phases: Define, Discover, Design, Develop, and Deploy. An optional sixth phase is a Demand phase that addresses feedback for long-term optimization.

The Define phase encompasses processes that define the business intent and concepts that are aligned with the business intent. Robust concept definition and ensuing communications ensure a proposed approach is on target with what a business wants delivered. Alignment with strategic network and information technology architectures is also facilitated. As a side benefit, the Define phase can reduce estimation time averages.

The Define phase typically comprises four steps, Intent, Ideation, Feasibility, and Estimation. Intent refers to processes that help define the business's strategic intent through the integration of mission, goals, objective, and capability models. Business-related decisions are made at this point without consideration of feasibility or design. Ideation encompasses formal and informal idea generation and the rigor of idea selection via validation against strategic intent. In the Ideation step a problem is defined in the context of Intent and a technical approach to the problem is developed. Intent and Ideation are specific to a particular business unit. The Feasibility step facilitates determination of technical approach, critical functional impacts, impacted systems, and overall feasibility of concepts prior to Estimation. The Estimation step facilitates estimation of level of effort to aid with prioritization and investment decisions. An appropriate capacity of personnel, hardware, and other resources can be reserved as needed to complete a project.

The Discover phase refers to the processes that help discover functional and system requirements in support of business requirements. The Discover phase facilitates a "process-driven" approach to requirements gathering. The analysis conducted in the Discover phase verifies the business processes envisioned and elicits all the requirements of the project. These requirements are documented in a centralized repository along with the business and system process models, thus enabling traceability and reuse on subsequent projects. As a by-product of the Discover phase analysis, it is possible to automatically generate interfaces as well as test workflows and test cases. These automation capabilities shorten the test window and overall project cycle time.

The Design phase deals with the processes that constitute definition of physical design specifications and that will serve as the basis for development efforts. The Design phase allows a consistent level of design detail across all development teams. This helps reduce the integration test window by enabling all development teams to develop to the correct interface specifications. Ultimately, this can result in shorter test windows and faster speed to market.

The Develop phase concerns the processes that create and test program code software according to the specifications detailed in the Design phase. The Develop phase typically consists of two steps, Application Code and Testing and Integrated Testing. Application Code and Testing refers to processes for creating and testing application system source code according to design specifications. Integrated Testing refers to planning and execution of testing activities to ensure successful integration of application systems.

The Deploy phase involves processes for planning and implementing the activities required to migrate program code from the development environment to the production environment. The Deploy phase typically encompasses two steps, Production Migration and Production Warranty. Production Migration defines the planning and execution activities required for migration from the development environment to the production (operational) environment. Production Warranty refers to the activities required during the transition period between deployment and on-going maintenance (also known as the warranty period) to ensure successful deployment.

An enterprise-wide EAI process such as the EDP can be hosted in a tool called the EDP Portal. The EDP Portal is a web-based software application that supports a process-based, activity-based management model of software development by providing an organization-wide, standardized means of collecting, managing, and reporting on work flowing through the software development process. The Portal can provide a real-time, synergistic combination of a collaboration tool, a reporting interface, and a planning/execution environment. The Portal enables all parties associated with a project to see its status and allows information about a project to be documented from its inception. The Portal can provide a common touch-point for collecting and managing project information. It can also be a vehicle for collaboratively planning, managing, and executing a project and for distributing up-to-date project information in real time, without additional post-processing or analysis. In addition, it can provide a standardized means of collecting and analyzing process performance data by acting as a data warehouse that "distills" performance information from actual activity as a project progresses through time. Project information can be entered into the Portal automatically when certain events occur or can be maintained directly by users of the tool as part of their normal job-function workflow.

The Portal can integrate itself into the work environment by becoming the primary point of contact for reporting and disseminating project status, performance, and other project information. It can provide the primary interface for project workflow at the process level. The design can incorporate a workflow model organized by process touch-points, such that process steps have "work queues" from which process data are collected or presented when a project reaches a specific step.

Project information that can be displayed in the Portal can include the purpose and objectives of a project, a process description, a funding group, a high level approach, a schedule, schedule performance (planned vs. actual), hold time, estimates (level of effort), impacted systems, impacted applications, resources assigned, forecasted expenses, and actual expense information.

Other parameters that can be shown include project type, project size, and project status. The Portal can provide a multi-dimensional view of status (what stage a project is in, how long a project has been at a particular stage, which stages a project will enter) and performance (how long a project has taken, how much a project has cost). The priority of a project can be captured from the perspective of either the customer or the supplier. Provisions can be included for collecting process quality data (planned vs. actual) and performing calculations on this data to produce quality metrics.

The Portal can provide a capability-based security model such that specific roles are allowed or disallowed access to data, depending on the nature of the role assigned to the user. Thus, different users can have different levels of authority for viewing and editing the information displayed in the Portal.

The Portal can automatically track the dates of significant events in the lifecycle of a project. For example, the dates of transitions of a project from one stage to the next can be automatically recorded. This limits the opportunities for users to manually enter transition dates and thus prevents errors and deliberate entry of false information. In addition to the actual transition dates, planned dates for transitions can automatically be created and/or tracked. The original set of planned transition dates can be referred to as the baseline dates. Capturing the baseline dates allows the progress of a project to be compared to its original schedule. If changes occur in a project's schedule, the revised planned transition dates can be entered manually or can be generated automatically based on the typical lengths of time for transitions to occur. Depending on the process involved, either the baseline dates, subsequent planned dates, or both can be automatically captured in the Portal.

A project-related concept can be described in the Portal and the description can be sent to a review board where the concept can be evaluated and scored as to its worthiness to be approved to become a project. Each project sponsor can have its own review process and scoring criteria.

The Portal can be considered a series of web-based graphical user interfaces, or screens, in which project-related data can be viewed or edited. A set of screens can show the process flows for various phases of a concept or project. A user who wants to see all concepts or projects in a particular state can click on that state and all concepts or projects in the selected state will be displayed. For example, FIG. 1 shows the steps in an embodiment of the concept creation and selection process. A new concept 110 first passes through a concept development step 120. If the concept is not approved for further processing, it is placed in a trash bin 125. If the concept is approved for further processing, it enters a concept review process 130. This can consist of a concept review step 131, a concept scoring step 133, and a decision on further action regarding the concept. Decisions can include approval of the concept for further processing 135, deferral of the concept 137, and rejection of the concept 139. If the concept is approved for further processing, an identifying Service Request number can be assigned in step 140. Upon approval, a concept can be sent to one of several end organizations, known as pipelines, that will perform further processing on the concept. Three pipelines for approved concepts are shown in FIG. 1: a development pipeline 150 for projects that are intended to go into actual production, an R&D pipeline 160 for projects that are for research purposes only, and a tech planning pipeline 170 for projects dealing with the creation or modification of internal standards. While only three pipelines are shown in FIG. 1, other pipelines could be present. For example, there could be planning pipelines that deal with planning for development work, production support, research and development, and other types of planning. Other pipelines could deal with defining budgets. Collectively, the pipelines represent all of the organizations that perform any type of processing on concepts so that any concept that enters the concept creation and selection process and is approved for further processing will enter one of the pipelines. When a flow chart such as that in FIG. 1 is displayed in the Portal, a mouse click on any of the buttons represented by the boxes in the figure can take a user to a screen showing all concepts or projects in the selected state. For example, a user clicking on the concept scoring box 133, will be shown all concepts for which scoring is being conducted. An additional mapping button 180 allows users to see which projects are related to which larger-scale initiatives.

Figure 2:
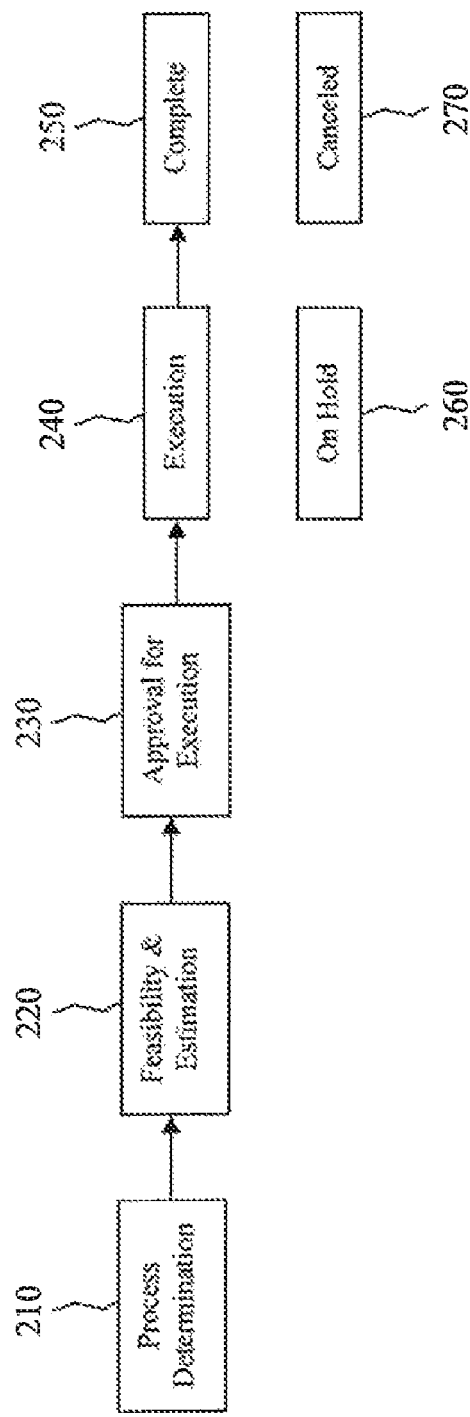
FIG. 2 is a flow chart depicting an embodiment of the R&D pipeline.
Figure 3:
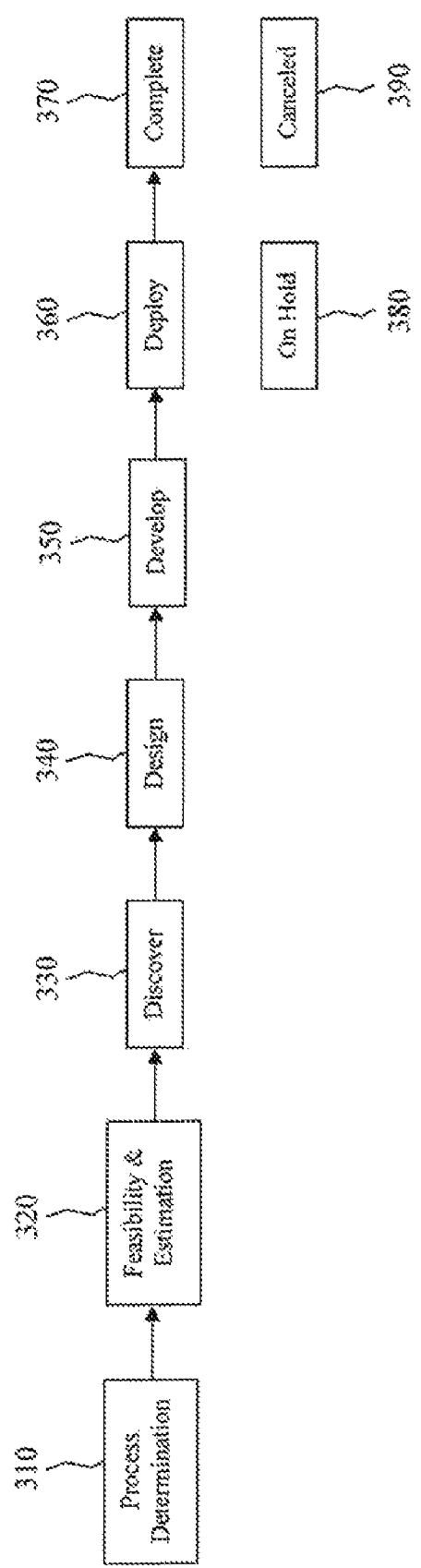
FIG. 3 is a flow chart depicting an embodiment of the development pipeline.

A flow chart for an embodiment of the R&D pipeline is shown in FIG. 2. A process determination step 210 first takes place in which a project is assigned a project type such as a technology assessment, a vendor assessment, or a business support project. A feasibility and estimation step 220 then occurs. The concept can then be approved for execution in box 230. Execution of the project occurs in box 240 until the project is complete in box 250. Clicking on any of these buttons displays projects in the selected state. Additional buttons allow a user to be shown projects on hold 260 or canceled 270. FIG. 3 shows an embodiment of the development pipeline. A process determination step 310 and a feasibility and estimation step 320 take place before the usual Discover 330, Design 340, Develop 350, and Deploy 360 phases of the EDP process. The project is complete in box 370. Clicking on any of these buttons displays projects in the selected state. Additional buttons allow a user to be shown projects on hold 380 or canceled 390.

One of the screens in the Portal can allow a user to enter information regarding a concept for a new project. This information can include a name for the project, the purpose of the project, the business unit funding the project, and the pipeline the project will enter. The Portal can automatically assign an identification number to the concept at this point. Another screen can give a list of all concepts in the process of being defined and edited. This screen can show information such as a name and identification number for a concept, a sponsoring organization for a concept, the priority of a concept, an evaluation or score of the worthiness of a concept, and the status of a concept. Users have the capability of filtering this screen so that only those concepts that fit into one of these information categories are displayed.

In another screen, a user can be given the capability of specifying the next stage a project-related concept will enter.

Information on this screen can include the title, identification number, score, priority, and sponsoring organization for the concept. The date the concept was created, the person who created it, and the pipeline it is intended to enter can also be displayed. An additional set of fields can list the actions that can be taken with the concept. One option that might be available is to approve the submission of the concept to the designated pipeline and thus approve the transition of the concept into an actual project. Other options might include changing the pipeline the project enters, returning the project to the submitting organization for rework, deferring the project until a later time, and rejecting the concept. An appropriately authorized user can select one of these options and thereby send the concept to another stage.

Another screen can allow a user or a review committee to enter or edit a score for a concept. Dimensions for which scores can be given include business need, innovation and value added, architectural fit, and readiness. Within the business need dimension, subdimensions can include type of initiative, owning organization, dependencies, and time sensitivity. Subdimensions in the innovation and value added dimension can include technology categorization, technology innovation, expected added value, and level of effort. Within the architectural fit dimension, subdimensions can include type of solution and strategic alignment. Subdimensions in the readiness dimension can include internal expertise and execution readiness. A field for comments on each of the subdimensions can also be provided. The screens on which concept scores are entered can take the form of customizable scorecards. Each review committee can have its own scorecard with its own dimensions, subdimensions, and weighting scales for each scored element. For example, a committee reviewing a research and development concept might not be concerned with the return on investment of the concept and so would not have a return on investment dimension on its scorecard.

For a project entering the R&D pipeline, a screen can allow the user to designate the next step the project is to take. In addition to identifying information such as that described above, this screen can display a list of possible actions to be taken with the project. These actions can include submitting the project for approval for execution, returning the project to a process determination step, specifying that an application impact analysis is to be performed on the project, and designating the project to be ready for approval.

Another set of screens can show the status of projects in progress. One of these screens can describe the application impact a project is expected to have, with estimated costs and labor hours being given in ranges from an expected minimum to an expected maximum. Another of these screens can show the schedule for a project including the planned and actual start dates and planned and actual finish dates for the various steps within a project. As described above, these dates are typically entered into the Portal automatically when significant events occur but authorized personnel can be allowed to enter dates manually. Another of these status screens can display the various roles, such as project manager, lead architect, and domain architect, that need to be filled in order to complete a project. This screen can also show the individuals assigned to these roles. An appropriately authorized person can use this screen to assign personnel to roles, remove personnel from roles, and designate the start and end dates for an individual's assignment to a role. Another status screen can display a summary of the estimated level of effort for a project. Information on this screen might include identifying information for the project, personnel assigned to various roles within the project, estimates of the costs and number of hours expected to be needed to complete the project, the date the estimates were made, and the assumptions made in making the estimates.

The Portal can include screens that display the history of a project. One screen can show the start and end dates for each of the stages that a project passes through from conception to completion. Another screen can allow a history of all actions taken with respect to a project to be viewed. This screen can show not only the dates when state transitions occurred but also dates when viewing or editing of project-related information occurred. The person performing the action and the previous and next steps in the project can also be shown.

When a process or a step within a process is completed, the Portal can automatically update the schedule with the completion date. The Portal can also include provisions for direct notification of such events to end users, using electronic mail or other messaging technologies. This allows the Portal to drive the next activity in a project by automatically sending emails to the personnel responsible for completing the next activity. Emails might be sent to an individual, everyone in a role, everyone on a project, everyone on a distribution list, or other appropriate personnel. For example, when a project moves to the state where estimation is to be done, emails can automatically be sent to the appropriate personnel informing them to do estimates. In another example, an email might say that a project has been approved for analysis and might tell the appropriate person to complete the analysis. The person can be informed to update the Portal with the impacted applications and the due date for the next step in the process. Notification emails can have a link that takes the recipient directly to the section of the Portal that needs to be completed.

When a notification email is sent, a timer can start so that the length of time it takes the recipient to take the required action can be tracked. A ticket could be automatically opened when the timer reaches a predetermined deadline.

The system can act as a true "portal," linking in references to or data from multiple sources such as knowledge/document management systems, fiscal information systems, financial time reporting systems, project management information systems, a human resources data system, a billing system, a requirements management system (such as the DOORS tool produced by Telelogic), a process modeling tool (such as Corp Modeler produced by CaseWise or Ptech produced by Ptech, Inc.), and a tactical project planning and management tool (such as Microsoft Project).

A component of the EDP Portal can be a software-based forecasting tool that provides a platform for streamlining resource forecasts, workforce management, and associated processes. This tool can be used in the Estimation step of the Define phase of the Enterprise Development. Process as an aid in the reservation of resources. The forecasting tool can increase forecasting accuracy by leveraging the automation and information integration capabilities of an online environment.

At any point in a project, either the customer or the supplier may wish to amend the terms of the contract that defines the project. A request for such an amendment to the contract can be referred to as a change request. Approved change requests can be rolled into the parent project. The Portal can provide a screen that allows users to submit change requests. Information that might be entered on this screen includes an identification number for the project, a title for the change request, the organization sponsoring the project, the organization requesting the change, the organizations impacted by the change, the type and cause of the change, identifying information on the person requesting the change, and a free-form description of the change and its expected benefits. Another screen can display the history of actions that have been taken against a change request.

Change requests can be divided into Discover change requests, which document and track significant changes to projects during the Discover phase, and post-Discover change requests, which document and track changes impacting cost, scope, or schedule during the Design, Develop, and Deploy phases. More generally, the change requests could be referred to as pre-contract and post-contract since the creation of a contract is the last step in the Discover phase. It is typically easier to make changes to a concept or a project before a contract has been agreed upon than afterwards. Change requests can be assigned cause codes that indicate the reason for the requested change. In an embodiment, Discover change requests have six different cause codes, five dealing with changes that have a business impact and one dealing with changes without business impacts. The business-impacting causes can include the addition or deletion of hardware or third party software, the addition or deletion of a product line, the addition or deletion of a market segment or sales channel, the addition or deletion of a vendor, and a dramatic change in an architectural approach. The cause code dealing with changes without business impacts applies to missed application, network, or operations impacts. Post-Discover change requests can have numerous cause codes, which can be broken down into categories of quality, cost, and schedule. Examples of quality-related cause codes include an additional distribution channel and an improved technical approach. Cost-related cause codes can include a change in a marketing offer and a missed operational impact. Schedule-related cause codes can include changes associated with getting a product to market quicker and changes to the scope of a project due to a third party schedule change.

Figure 4:
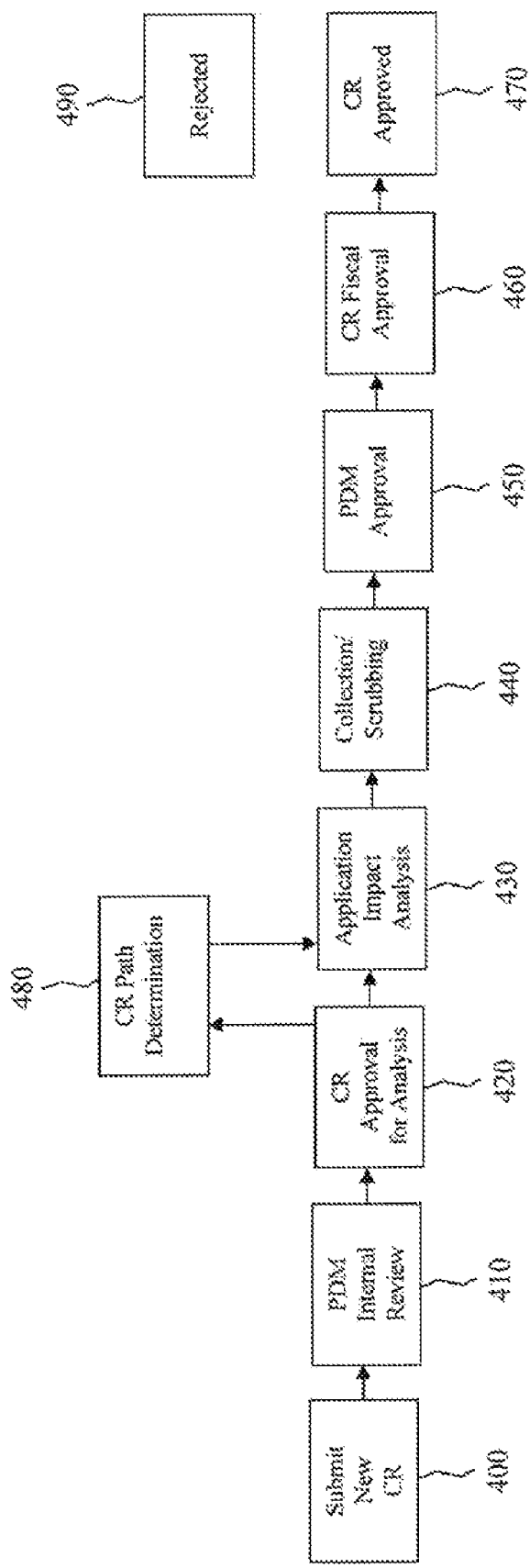
FIG. 4 is a flow chart depicting an embodiment of the change request process flow.

A process flow specifically for change requests can be defined within the Portal. An embodiment of the change request process flow is shown in FIG. 4. In box 400 a new change request is submitted. In box 410 the change request undergoes internal review by a product development manager. The change request can be approved for analysis in box 420 and can undergo application impact analysis in box 430. In impact analysis, suppliers provide estimates on how a change request is likely to affect a project. Collection and scrubbing of the change request can occur in box 440. In box 450 approval of the change request by the product development manager can be granted and in box 460 fiscal approval can be granted. Final approval of the change request can be granted in box 470. Change requests that have a business impact are sent to a path determination step in box 480 after being approved for analysis in box 420. In this step a committee typically made up of an enterprise architecture architect, integration personnel, and network and operation personnel reviews the change request and identifies organizations that will be impacted by the requested change. From box 480, the application impact analysis 430 and subsequent steps as described above can take place. When a flow chart such as this is displayed in the Portal, a mouse click on any of the buttons represented by the boxes in FIG. 4 can take a user to a screen showing all change requests in the selected state. An additional box 490 allows a user to be shown rejected change requests.

To further demonstrate the capabilities of the Portal, several examples will now be given to illustrate how a user might navigate through the Portal and make use of its features. In all of the examples a user begins by opening a web browser and entering an address that links to the Portal home page, an internal web site within the user's enterprise that acts as the starting point for all activities to be taken within the Portal. Before the user is taken to the Portal home page, a sign on screen appears where an existing user can enter a login ID and a password or a new user can register for access to the Portal.

A new user can create a Portal account by entering an employee ID number into an account signup screen. Other information about the user, such as name, telephone number, and cost center, is then automatically loaded from the enterprise's employee database into the account signup screen. The user can also select a role to be assumed for a particular project. A validation check is performed on the user and valid employees are automatically given access to the Portal. Assignment to a specific role within a project can require the approval of a supervisor or role administrator. An email containing a login ID and a password is automatically sent to a user who is approved for access. When logging in to the Portal for the first time, a new user is prompted to change the default password supplied by the registration process.

A user entering a valid login ID and password into the login screen is taken to the Portal home page. The home page contains a text area where a user can enter the identification number of a concept or project and be shown information related to that concept or project. The identification number can also be referred to as a Service Request, or SR, number. Another text area allows a user to enter an identification number for a release, or a set of related projects, and be shown information related to that release. In either of these text areas, the user can enter information manually or can choose from a drop-down list of available concepts, projects, or releases.

Information that is shown when a user enters an SR number for a concept or a project includes Level of Effort (LOE) information, a summary, concept information, application impact information, schedule information, resource information, and report information. Buttons, tabs, or other linking mechanisms for each of these categories of information can be present on the screen that appears when a user enters an SR number. When the LOE information tab is chosen, a list shows all SR's for which LOE's need to be submitted, where an LOE can be defined as an estimate of the labor and materials needed to complete a project. The summary page displays the current status of a project including project type, phase, step, sub-step, and approved LOE options. Change requests associated with an SR are also shown on the summary page. Authorized users are able to edit many of the fields on the summary page. The concept page shows details about a concept including a description of the concept, an identification number for the concept, the business unit funding the concept, the date when the concept was submitted, a requested delivery date for the project, personnel connected to the concept, and other concept-related information. The application impact page provides a summary of the effects of the concept on impacted applications or organizations. This can include the type of impact, estimated LOE's for a project, and estimated hardware and software costs. The schedule page contains project milestones such as the planned and actual start dates and the planned and actual end dates for the various sub-steps of a project. The sub-step that the concept is currently in is highlighted. The resources page displays the personnel assigned to various roles within a project. Authorized users can reassign roles on this page. The reports page generates summary reports on concepts, LOE's and other project-related information. Numerous other tabs or linking mechanisms displaying other concept-related information could be present. These could include tabs for a project forecast and for financial information such as how much has been spent on a project to date.

The home page also displays buttons or other linking mechanisms that can take the user to the major functional areas within the Portal. For ease of reference, specific names are given here for the buttons but it should be clear that any names could be used as long as the corresponding functional areas are similar to those described here. The buttons can be referred to as Concept Creation, In Progress, Change Request Management, Statistics, Finances, Personal Profile, Admin, and What's New.

The Concept Creation button takes the user to a set of screens where information about project-related concepts can be entered and edited. The screen that is displayed when the Concept Creation button is selected has tabs named Concept List, New Concept, and Concept Submission Queue. A user selecting the Concept List tab is shown a list of all currently active concepts.

When the New Concept tab is chosen a screen appears where a user can enter information about a new concept. This includes, among other items, the name of the concept, the funding business unit, the expected delivery date, and details about the concept representative. The screen takes the form of a series of data labels for information needed to describe the concept. Adjacent to the labels are blank text areas where a user can enter the required information. Pop-up help messages appear when a user clicks on one of the data labels. In addition, several blank text areas are provided where a user can enter free-form text to describe the purpose, scope, objectives, cost considerations, strategic alignments and drivers, assumptions, and other information regarding the concept. Check boxes are also present by means of which a user can answer questions about the concept. When all of the appropriate information has been entered, the user clicks on a "save" button and a concept number is automatically assigned to the concept.

Authorized users can designate the course of action to be taken with a concept by clicking on the Concept Submission Queue tab in the main Concept Creation screen. When this tab is selected the user is taken to a screen showing all concepts currently awaiting further processing and the actions that can be taken with concepts. The actions include assigning an SR to the concept, sending the concept back to its author, and submitting the concept to a feasibility study. The user can click on the identification number of a concept to choose the concept to be processed and then click on the action to be taken. If the concept is approved, the user can assign an SR to it. Alternatively, the user can choose to send the concept back to the author if errors or incomplete information are found in the concept. When this option is chosen, a text box appears in which the user can enter comments to the concept author. The Portal then automatically sends an email to the author with a notification of the rejection and the user's comments. The user can also choose to submit the concept to a concept analysis pipeline manager for a feasibility study. If this option is selected, the Portal automatically moves the concept out of the concept submission queue and into a path determination sub-step, sends an email to the concept analysis pipeline manager notifying him that the concept has been submitted, and records the date when the concept was submitted to the concept analysis pipeline manager. The user has the option of adding comments to the email that is sent to the concept analysis pipeline manager.

The In Progress button on the Portal home page takes a user to a set of lists of all the current projects in various phases and steps. The first screen displayed when the In Progress button is selected shows a single tab for all EDP phases and an individual tab for each of the five major phases within EDP, namely Define, Discover, Design, Develop, and Deploy. Clicking on the tab for all EDP phases lists information on all projects currently active, while clicking on a tab for one of the individual phases shows information on SR's that are currently in that phase. For example, clicking on the Define phase tab will display all projects that are in the Define phase. Within the screens for each of the phases other tabs may be present that allow a user to see projects in various sub-steps within the phase.

The screen displayed when the In Progress button is selected can also contain a button that links to a set of screens that allow users to create and enter information for a new concept. The concepts that can be created here include both standalone projects that represent discrete requests for work and parent projects with multiple iterations, each of which represents a discrete request for work. The user is taken to a screen where a standalone project, a parent project, or an iteration of a parent project can be chosen. After choosing which type of project is to be created, the user is taken to a screen similar to the screen described above under the New Concept tab of the Concept Creation screen. The user then enters the pertinent information for the project. Information about existing projects can be edited in a similar manner.

The In Progress button can also be used by non-IT organizations to enter LOE's describing how a concept might affect their organizations. To do so, a user clicks on an Estimation tab under the Define tab on the main In Progress page. The user then selects a concept by clicking on its SR number. On the next screen the user chooses the Application Impact tab and the Edit option. The user can then add a brief description of the impact and add or edit estimates of the number of hours expected to be expended on the project and the hardware and software costs. Assumptions made in deriving the estimates and the requirements driving the impact can also be entered. In some cases a user may also be required to specify whether the costs for a project are expenses, capital expenditures, or both. When a project involves both expenses and capital expenditures, the user may be required to specify which costs fall into which categories. The information entered can be saved by clicking on a Submit button.

The Change Request Management button on the Portal home page is used to create, view, and process change requests. Many of the functions described here as accessible through the Change Request Management button can also be accessed by entering a change request number into an appropriate text box on the Portal home page or by clicking on a "Submit a Change Request" link on the Portal home page. Clicking on the Change Request Management button takes a user to a list of change requests where the desired change request can be selected. When a change request is selected from the list the main change request screen appears. Alternatively, when a change request number is entered on the Portal home page, the user is taken directly to the main change request screen. This screen includes a depiction of the change request process flow and a set of tabs that categorize the change request information. The tabs are labeled Change Request, Application Impact, Schedule, Resources, and Reports. The Change Request tab contains details of the change request as entered by a change request author and specifies the state in the change request process flow in which the change request is located. This tab also includes a link to the parent SR of the change request. The Application Impact tab shows the location within the Estimation state of the applications impacted by the change request. The tab also lists actions available for each impacted application based on the location of the change request in the change request process flow and on the authority of the person attempting to perform the action. The Schedule tab allows a user to view the actions that were taken on a change request as it moved through the various states in the change request process flow. Two views, a steps history and an actions history, are available. The steps history view shows the steps or states a change request has been in and the dates the change request entered and left each of the states. The actions history view shows the actions performed on a change request, the date the action was performed, who performed the action, the previous state the change request was in, and the next steps available to the change request. The Resources tab shows all personnel approved to perform an action on a particular change request and the level of authority that they have. The Portal can take this information directly from the parent SR when the change request is created. The Reports tab allows a user to create various reports related to change requests.

In addition to the tabs, the main change request screen also contains a depiction of the change request process flow similar to that shown in FIG. 4. The boxes shown in FIG. 4 appear as clickable buttons on the main change request screen. The button corresponding to the current state of a selected change request is highlighted. A user can submit a new change request by clicking on the Submit New Change Request button (400 in FIG. 4). Alternatively, clicking on the "Submit a Change Request" link on the Portal home page performs the same function. When either of these methods is used to submit a change request, the user is taken to a screen where information about the change request can be entered. This information includes the SR number to which the change request applies, a title for the change request, the organizations sponsoring and requesting the change, the change request type, and the cause code for the change request. The change request title must be entered manually but the other information can be entered manually or can be selected from a pull-down menu created automatically by the Portal to contain the appropriate information. The sponsor organization is the organization paying for the change request. If there is more than one sponsor the user selects the organization with the primary financial responsibility. The organization requesting the change can be the same as or different from the sponsor organization. The change request type is either a Discover change request or a post-Discover change request as described above. The cause codes, as described above, can include such changes as the addition or deletion of hardware or the addition or deletion of a market segment. Other information a user enters when submitting a change request includes a free-form description of the change request and a free-form description of the expected benefits of the change request. Next, the user enters the email addresses of any individuals to be notified of the change request. When all of the required information has been filled out, the user clicks on a "Submit" button to save the change request in the Portal. The Portal automatically assigns an identification number to the change request and records the date when the change request was created.

All change requests created by the above process are automatically placed in the PDM Internal Review state (410 in FIG. 4). By clicking on the PDM Internal Review button, a user is taken to a PDM Internal Review screen where all change requests in the PDM Internal Review state are listed. On this screen, a Product Development Manager (PDM) for the parent SR of a change request can determine if a particular change request should be approved for further processing or rejected. For each change request in the PDM Internal Review state, this screen lists the change request sponsor organization, the SR sponsor organization, the identification number, title, and cause code of the change request, the date the change request was created, the person who created the change request, and a list of the next steps that can be taken with the change request. The next steps include viewing, withdrawing, approving, and rejecting a change request. All Portal users have authority to view change requests in this state. When the view option for a change request is selected, a screen appears listing all the information entered when the change request was created. Only the author of a change request has authority to withdraw the change request in this state. Only a PDM assigned to a parent SR associated with a change request can approve or reject a change request. When an authorized PDM clicks on the approval option, a box appears asking for confirmation of the approval. If the PDM confirms that the change request is approved for further processing, the change request is automatically moved to the Change Request Approval for Analysis state and an email notification of the approval is automatically sent to the appropriate approver for change request analysis. When an authorized PDM clicks on the rejection option, a box appears asking for confirmation of the rejection. If the PDM confirms that the change request is rejected, a screen appears on which the PDM must select a reason for rejection. A list of pre-defined reasons appears in a pull-down menu. Upon selecting a reason and adding any optional comments, the PDM clicks a "Submit" button. An email notification of the rejection is then automatically sent to the author of the change request.

Change requests approved in the PDM Internal Review step are automatically placed in the Change Request Approval for Analysis state (420 in FIG. 4). By clicking on the Change Request Approval for Analysis button, a user is taken to a Change Request Approval for Analysis screen where all change requests in the Change Request Approval for Analysis state are listed. For each change request in the Change Request Approval for Analysis state, this screen lists the change request sponsor organization, the SR sponsor organization, the identification number, title, and cause code of the change request, the date the change request was created, the person who created the change request, and a list of the next steps that can be taken with the change request. The next steps include viewing, withdrawing, approving, and rejecting a change request. All Portal users have authority to view change requests in this state. When the view option for a change request is selected, a screen appears listing all the information entered when the change request was created. Only the author of a change request has authority to withdraw the change request in this state. For non-business-impacting change requests, only the PDM's assigned to a parent SR associated with a change request can approve or reject a change request. Change requests that do have a business impact are approved or rejected by a single point of contact who has been assigned that role. When an authorized PDM or single point of contact clicks on the approval option, a box appears asking for confirmation of the approval. If the PDM or single point of contact confirms that the change request is approved for further processing, a change request without a business impact is automatically moved to the Application Impact Analysis state while a change request with a business impact is automatically moved to the Change Request Path Determination state. In either case, an email notification of the approval is automatically sent to a Lead Architect. When an authorized PDM or single point of contact clicks on the rejection option, a box appears asking for confirmation of the rejection. If the PDM or single point of contact confirms that the change request is rejected, a screen appears on which the PDM or single point of contact must select a reason for rejection. A list of pre-defined reasons appears in a pull-down menu. Upon selecting a reason and adding any optional comments, the PDM or single point of contact clicks a "Submit" button. An email notification of the rejection is then automatically sent to the author of the change request.

As indicated above, change requests approved in the Change Request Approval for Analysis step can take one of two paths. Change requests that have a business impact (as determined by the cause code) go to the Change Request Path Determination state (480 in FIG. 4). In this state, a path determination team identifies organizations that might be impacted by the change request. The team can include enterprise architecture architects, integration management personnel, and network and operations personnel. By clicking on the Change Request Path Determination button, a user is taken to a Change Request Path Determination screen where all change requests in the Change Request Path Determination state are listed. From the Change Request Path Determination state, business-impacting change requests move to the Application Impact Analysis state (430 in FIG. 4). Change requests that do not have a business impact move directly from the Change Request Approval for Analysis state to the Application Impact Analysis state, bypassing Change Request Path Determination.

The Application Impact Analysis state contains all change requests that were approved by the PDM or single point of contact in the Change Request Approval for Analysis step. By clicking on the Application Impact Analysis button, a user is taken to an Application Impact Analysis screen where all change requests in the Application Impact Analysis state are listed. In this state, a Lead Architect identifies all applications impacted by a change request, specifies an LOE due date, and requests that LOE providers submit LOE's based on the estimated impact of the change request.

After requests for LOE's have been sent to all LOE providers, a change request enters the LOE Collection and Scrubbing state (440 in FIG. 4). By clicking on the LOE Collection and Scrubbing button, a user is taken to an LOE Collection and Scrubbing screen where all change requests in the LOE Collection and Scrubbing state are listed. Change requests for which LOE's have been requested are placed in this state. As LOE providers enter their LOE's in the Portal, they mark their LOE submissions as complete. The Lead Architect reviews the submitted LOE's and edits them as necessary. When all required LOE's have been received and edited, the Lead Architect places the change request in the PDM Approval state.

The PDM Approval state (450 in FIG. 4) contains all change requests that are ready for approval by the PDM. When a user clicks on the PDM Approval button, a list of change requests in the PDM Approval state appears. Similar to the screens described above, details about each change request and a list of actions that can be taken with each change request appear on this screen. The actions that can be taken at this point include viewing a change request, viewing the change request-related LOE's submitted in the previous step, and approving, rejecting, or withdrawing a change request. All Portal users can view change requests in this state and LOE's related to a change request in this state. Only a PDM assigned to a parent SR associated with a change request can approve or reject a change request. Only the author of a change request can withdraw the change request in this state. When a PDM selects the approval option, a box appears asking for confirmation of the approval. If the PDM confirms that the change request is approved for further processing, the change request is automatically moved to the Change Request Fiscal Approval state and an email notification of the approval is automatically sent to an appropriate change request approver. When a PDM selects the rejection option, a box appears asking for confirmation of the rejection. If the PDM confirms the rejection, a screen appears on which the PDM must select a reason for the rejection. A list of pre-defined reasons appears in a pull-down menu. Upon selecting a reason and adding any optional comments, the PDM clicks a "Submit" button. An email notification of the rejection is then automatically sent to the author of the change request.

From the PDM Approval state, change requests move to the Change Request Fiscal Approval state (460 in FIG. 4). By clicking on the Change Request Fiscal Approval button, a user can view all change requests in the Change Request Fiscal Approval state, i.e., all change requests approved in the previous state. The Change Request Fiscal Approval state is a checkpoint that gives a change request approver the ability to view change request-related LOE's to ensure that fiscal compliance on a project is not comprised. As with the PDM Approval state, options for viewing details of a change request, viewing change request-related LOE's, and approving, rejecting, or withdrawing a change request are available on a Change Request Fiscal Approval screen. All Portal users have authority to view change requests and change request-related LOE's in this state. Only the author of a change request has authority to withdraw the change request in this state. For non-business-impacting change requests, only the PDM's assigned to a parent SR associated with a change request can approve or reject a change request. Change requests that do have a business impact are approved or rejected by a single point of contact who has been assigned that role. When an authorized PDM or single point of contact clicks on the approval option, approval of the change request is considered final and the approved change request information automatically appears on the parent project's Application Impact tab in the Portal. When an authorized PDM or single point of contact clicks on the rejection option, a box appears asking for confirmation of the rejection. If the PDM or single point of contact confirms that the change request is rejected, a screen appears on which the PDM or single point of contact must select a reason for rejection. A list of pre-defined reasons appears in a pull-down menu. Upon selecting a reason and adding any optional comments, the PDM or single point of contact clicks a "Submit" button. An email notification of the rejection is then automatically sent to the author of the change request.

When final approval has been granted, the change request moves to the Change Request Approved state (470 in FIG. 4). The LOE for the change request is then rolled into the parent SR at the appropriate level. That is, the cost estimates in the change request are used to modify the most recent estimate of the overall cost of the project. Throughout the course of a concept and its related project, numerous estimates of the cost of the project can be made. Numerous change requests can also be made that modify that cost. Each time a change request is approved, the estimated cost of the overall project is revised with the cost estimates contained in the change request so that the estimated project cost is kept up to date. For auditing purposes all earlier estimates are discarded and the revised estimate is treated as the original estimate. In this way estimators are not held accountable for estimates that are later modified by changes in the scope of a project. A user clicking on the Change Request Approved button is shown all change requests in the Change Request Approved state. At this point the only action allowed on the change request is the viewing of the change request details.

All change requests that were rejected or withdrawn at any point in the change request process flow are placed in the Rejected state (490 in FIG. 4). A user clicking on the Rejected button is shown all change requests in the Rejected state.

When a change request has been rejected or withdrawn, it is permanently placed in the Rejected state; it cannot be removed from that state and resubmitted into the change request process flow. If a rejected or withdrawn change request is to be resubmitted for approval, a new change request must be created.

The Statistics button on the Portal home page links to a page showing various statistics about a concept or project. The Finances button links to reports generated from data that the Portal has collected from financial applications such as OnTrack. The Personal Profile button allows a user to perform updates on the user profile, password, and other user-related information. Clicking on the Admin button allows a user to perform administrative tasks within the Portal. The What's New button shows new features recently added to the Portal.

In addition to the buttons, tabs, and other linking mechanisms described above, the Portal also contains buttons commonly found on web sites such as a Home button and a button for contacting the web site administrator.

Figure 5:
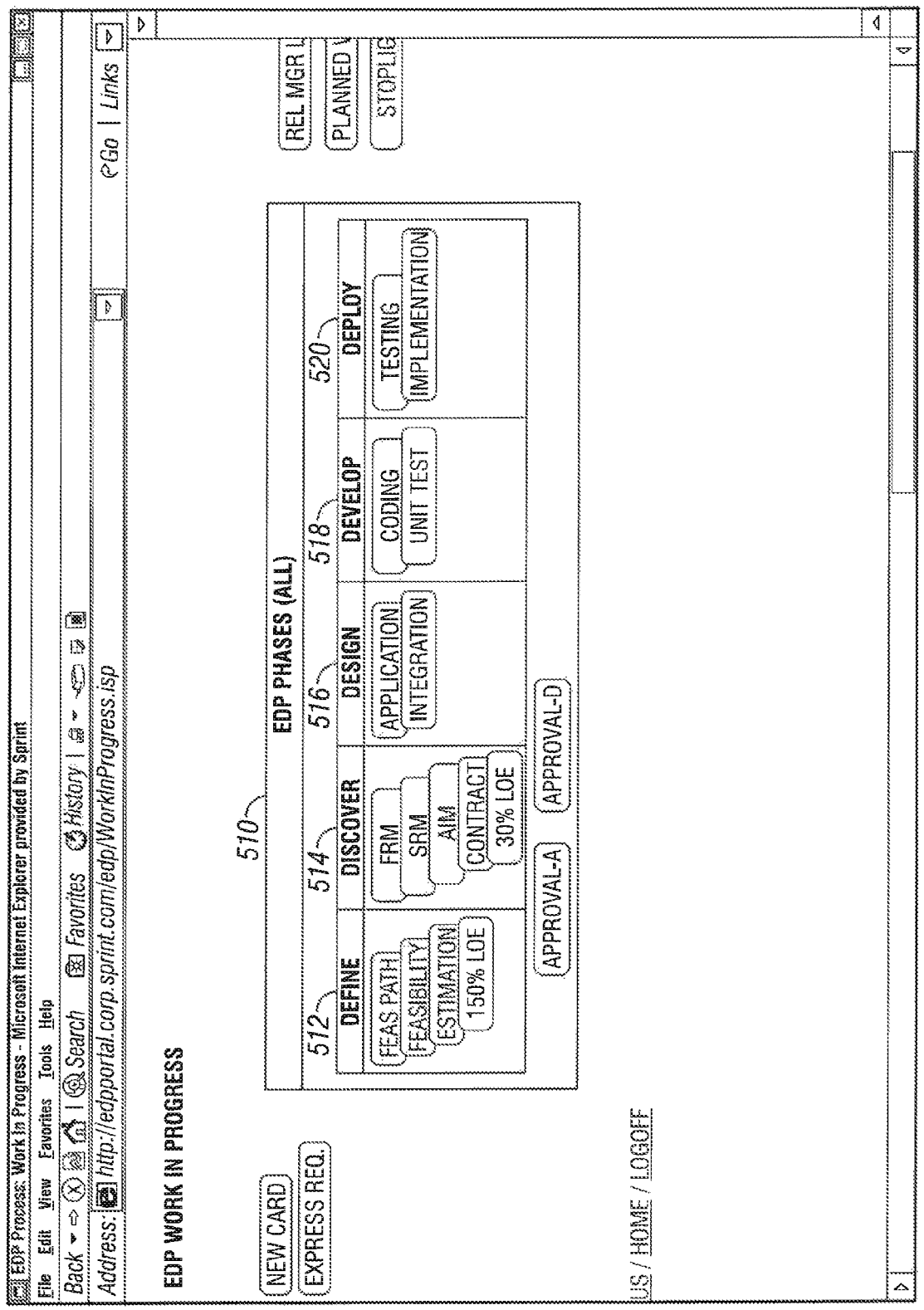
FIG. 5 is a depiction of a graphical user interface that might appear in the Portal.

An example of a screen that might appear in the Portal is shown in FIG. 5. By clicking on an EDP Phases (All) link 510 a user can view all EDP phases currently active. By clicking on a Define link 512, a Discover link 514, a Design link 516, a Develop link 518, or a Deploy link 520, a user can view all SR's that are currently processing in the selected phase. Beneath each of these links, other links associated with their respective phases might be present. Clicking on one of these sub-links will take a user to the appropriate sub-phase.

Another example of a screen that might appear in the Portal is shown in FIG. 6. This is a screen that might appear when a user selects a link to show detailed information about a concept. This screen displays information such as hardware and software costs 610, LOE hours 612, the impacted applications or organizations 614, the type of impact 616, and an impact summary 618.

The EDP Portal is unique from other applications on the market in that it focuses on developing a cohesive, multi-dimensional view of project information throughout the project lifecycle by integrating directly with end-user work products, process touch points, and work flow, such that it is an integral part of the day-to-day operations of a project.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for project development within an enterprise, comprising:
   gathering project related information from different sources within the enterprise, wherein the sources from which project related information is gathered include a plurality of:
      a human resources data system;
      a billing system;
      a fiscal information system;
      a financial time reporting system;
      a knowledge/document management system;
      a project management information system;
      a requirements management system;
      a process modeling tool; and
      a tactical project planning and management tool;
   using the gathered information to create a plurality of reports, at least one of the reports including a portion of the project related information from a first source and a portion of the project related information from a second source;
   displaying, in a graphical user interface providing access to a plurality of sub-graphical user interfaces, the gathered information and the reports for assessment;
   analyzing the displayed information and reports to monitor the progress of the project through the project development process;
   determining an end of a phase of the project development process wherein the phase comprises a segment of the project development process that includes multiple tasks that are grouped together as related functional processes;
   notifying at least one individual with responsibility for a next phase of the project development process, upon the completion of the previous phase within the project development process, by automatically sending a message to the at least one of the individuals with responsibility for the next phase in the project development process, the message informing the at least one individual that the next phase can begin;
   automatically determining a start date and an end date for the next phase in the project development process; and
   automatically updating a schedule of the project development process with the start date and the end date for the next phase.

2. A method for project development within an enterprise, comprising:
   gathering project related information from different sources within the enterprise, wherein the sources from which project related information is gathered include all of:
      a human resources data system;
      a billing system;
      a fiscal information system;
      a financial time reporting system;
      a knowledge/document management system;
      a project management information system;
      a requirements management system;
      a process modeling tool; and
      a tactical project planning and management tool;
   using the gathered information to create a plurality of reports, at least one of the reports including a portion of the project related information from a first source and a portion of the project related information from a second source;
   displaying, in a graphical user interface providing access to a plurality of sub-graphical user interfaces, the gathered information and the reports for assessment;
   analyzing the displayed information and reports to monitor the progress of the project through the project development process;
   determining an end of a phase of the project development process wherein the phase comprises a segment of the project development process that includes multiple tasks that are grouped together as related functional processes;
   notifying at least one individual with responsibility for a next phase of the project development process, upon the completion of the previous phase within the project development process, by automatically sending a message to the at least one of the individuals with responsibility for the next phase in the project development process, the message informing the at least one individual that the next phase can begin;

automatically determining a start date and an end date for the next phase in the project development process; and automatically updating a schedule of the project development process with the start date and the end date for the next phase.

3. The method of claim 1 wherein the reports include one or more reports selected from a group of reports consisting of:
the actual costs of a project;
the actual time spent on a project; and
quality metrics related to the actual costs and time of a project compared to the estimated costs and time.

4. The method of claim 1 wherein the reports include all of:
the actual costs of a project;
the actual time spent on a project; and
quality metrics related to the actual costs and time of a project compared to the estimated costs and time.

5. The method of claim 1 wherein further steps in the monitoring of the progress of the project are performed through interaction with a graphical user interface and include one or more steps selected from a group of steps consisting of:
approving the concept to move from one phase of the project development process to the next phase;
providing an estimate of the cost of a change to the scope of a project;
viewing the status of a project;
viewing a timeline of the work done on a project;
viewing a timeline of the work remaining on a project;
viewing the human resources assigned to a project;
viewing the large-scale initiatives to which the project is related;
automatically updating a schedule when project-related events occur; and
calculating a score reflecting the worthiness of a project-related concept.

6. The method of claim 1 wherein further steps in the monitoring of the progress of the project are performed through interaction with a graphical user interface and include all of:
approving the concept to move from one phase of the project development process to the next phase;
providing an estimate of the cost of a change to the scope of a project;
viewing the status of a project;
viewing a timeline of the work done on a project;
viewing a timeline of the work remaining on a project;
viewing the human resources assigned to a project;
viewing the large-scale initiatives to which the project is related;
automatically updating a schedule when project-related events occur; and
calculating a score reflecting the worthiness of a project-related concept.

7. A method for managing a project development process comprising:
characterizing the type of work to be done within a project;
categorizing the type of work based on the characterization;
routing the work to an appropriate organization based on the categorization;
displaying steps in the project development process in a set of computer-based graphical user interfaces all of which can be accessed, via one or more electronic links, from a single graphical user interface;
performing actions in the project development process through interactions with the graphical user interfaces;
upon the completion of a phase within the project development process, automatically sending a message to at least one individual with responsibility for the next phase in the project development process informing the at least one individual that the next phase can begin, wherein the phase comprises a segment of the project development process that includes multiple tasks that are grouped together as related functional processes;
automatically determining a start date and an end date for the next phase in the project development process; and
automatically updating a schedule of the project development process with the start date and the end date for the next phase.

8. The method of claim 7 wherein the actions include one or more actions selected from a group of actions comprising:
approving the concept to move from one phase of the project development process to the next phase;
providing an estimate of the cost of a change to the scope of a project;
viewing the status of a project;
viewing a timeline of the work done on a project;
viewing a timeline of the work remaining on a project;
viewing the human resources assigned to a project;
viewing the large-scale initiatives to which the project is related;
calculating a score reflecting the worthiness of a project-related concept;
creating reports related to the project development process; and
viewing the reports.

9. The method of claim 8 further comprising:
upon the completion of a phase within the project development process, automatically sending a message to at least one individual with responsibility for the next phase in the project development process informing the individual that the next phase can begin; and
automatically updating a schedule when project-related events occur.

10. The method of claim 7 wherein the actions comprise all of:
approving the concept to move from one phase of the project development process to the next phase;
providing an estimate of the cost of a change to the scope of a project;
viewing the status of a project;
viewing a timeline of the work done on a project;
viewing a timeline of the work remaining on a project;
viewing the human resources assigned to a project;
viewing the large-scale initiatives to which the project is related;
calculating a score reflecting the worthiness of a project-related concept;
creating reports related to the project development process; and
viewing the reports.

11. The method of claim 10 further comprising:
upon the completion of a phase within the project development process, automatically sending a message to at least one individual with responsibility for the next phase in the project development process informing the individual that the next phase can begin; and
automatically updating a schedule when project-related events occur.

12. A system for managing a project development process comprising:

a set of computer-based graphical user interfaces all of which can be accessed, via one or more electronic links, from a single graphical user interface, each of which displays project-related information and each of which allows actions in the management of the progress of a project to be performed through interaction with the graphical user interfaces, wherein upon the completion of a phase within the project development process, an action in the management of the progress of the project automatically sends a message to at least one individual with responsibility for the next phase in the project development process informing the at least one individual that the next phase can begin, a second action in the management of the progress of the project automatically determines a start date and an end date for the next phase in the project development process, and a third action in the management of the progress of the project automatically updates a schedule of the project development process with the start date and the end date for the next phase, wherein the phase comprises a segment of the project development process that includes multiple tasks that are grouped together as related functional processes.

13. The system of claim 12 wherein the actions include one or more actions selected from a group of actions consisting of:
    approving the concept to move from one phase of the project development process to the next phase;
    providing an estimate of the cost of a change to the scope of a project;
    viewing the status of a project;
    viewing a timeline of the work done on a project;
    viewing a timeline of the work remaining on a project;
    viewing the human resources assigned to a project;
    viewing the large-scale initiatives to which the project is related;
    calculating a score reflecting the worthiness of a project-related concept;
    creating reports related to the project development process; and
    viewing the reports.

14. The system of claim 13 further comprising:
    upon the completion of a phase within the project development process, automatically sending a message to at least one individual with responsibility for the next phase in the project development process informing the individual that the next phase can begin; and
    automatically updating a schedule when project-related events occur.

15. The system of claim 12 wherein the actions include each action of a group of actions consisting of:
    approving the concept to move from one phase of the project development process to the next phase;
    providing an estimate of the cost of a change to the scope of a project;
    viewing the status of a project;
    viewing a timeline of the work done on a project;
    viewing a timeline of the work remaining on a project;
    viewing the human resources assigned to a project;
    viewing the large-scale initiatives to which the project is related;
    calculating a score reflecting the worthiness of a project-related concept;
    creating reports related to the project development process; and
    viewing the reports.

16. The system of claim 15 further comprising:
    upon the completion of a phase within the project development process, automatically sending a message to at least one individual with responsibility for the next phase in the project development process informing the individual that the next phase can begin; and
    automatically updating a schedule when project-related events occur.

17. The method of claim 1 wherein the start date and the end date for the next phase in the project development process is determined based at least in part on typical lengths of time for transitions to occur.

18. The method of claim 7 wherein the start date and the end date for the next phase in the project development process is determined based at least in part on typical lengths of time for transitions to occur.

19. The system of claim 12 wherein the start date and the end date for the next phase in the project development process is determined based at least in part on typical lengths of time for transitions to occur.

* * * * *